United States Patent [19]
Pardillos et al.

[11] Patent Number: 5,367,646
[45] Date of Patent: Nov. 22, 1994

[54] UNIVERSAL DEVICE FOR COUPLING A COMPUTER BUS TO A CONTROLLER OF A GROUP OF PERIPHERALS

[75] Inventors: Jacky Pardillos, Plaisir; Paul Ravaux, Les Clayes Sous Bois, both of France

[73] Assignee: Bull S.A., Paris, France

[21] Appl. No.: 913,477

[22] Filed: Jul. 15, 1992

[30] Foreign Application Priority Data

Jul. 15, 1991 [FR] France ............................... 91 08908

[51] Int. Cl.$^5$ ............................................. G06F 13/00
[52] U.S. Cl. .................................. 395/325; 395/275; 364/239; 364/242.3; 364/239.3; 364/DIG. 1; 364/939; 364/939.2; 364/940.61; 364/DIG. 2
[58] Field of Search ............... 395/325, 275, 725, 200, 395/250; 364/239, 242.3, 239.3, DIG. 1, 939, 939.2, 940,61, DIG. 2

[56] References Cited

U.S. PATENT DOCUMENTS

| | | | |
|---|---|---|---|
| 4,744,078 | 5/1988 | Kowalczyk | 370/85 |
| 4,837,677 | 6/1989 | Barrus, Jr. et al. | 395/325 |
| 4,965,796 | 10/1990 | Petty | 370/112 |
| 4,996,690 | 2/1991 | George et al. | 371/37.1 |
| 5,136,584 | 8/1992 | Hedlund | 370/94.1 |

OTHER PUBLICATIONS

Computer Communication Review, vol. 18, No. 4, Aug. 1988 pp. 175-187, Kanakia & Cheriton.
Euromicro 88 Symposium on Microprocessing and Microprogramming, vol. 24, No. 1-5, Aug. 29, 1988, pp. 503-509.
Computer Technology Review, vol. 10, No. 14, Nov. 1990, pp. 37-39, Hsu & Greefield.

*Primary Examiner*—Allen R. MacDonald
*Assistant Examiner*—Glenn A. Auve
*Attorney, Agent, or Firm*—Kerkam, Stowell, Kondracki & Clarke

[57] ABSTRACT

An universal device (GPUI) for coupling a computer bus (PSB) to a controller (DEA) of a group of peripherals connected to one another by a specific link (FDDI) to which the controller is physically connected, includes a microprocessor (CPU) associated with a set of memories and an interface (IHAC, IHAD) for linkage with the controller (DEA) assuring the transfer of the data of the frames and of control blocks. The universal coupling device comprises a double-port random-access buffer memory (VRAM) connected by way of a first bus (B$_1$) to the interface (IHAD) and by way of a second bus (B$_2$) to the computer bus via a specific interface of the computer (MPC). Transfer of the data between the linking interface (IHAC, IHAD) and the double-port memory, on the one hand, and between the latter (VRAM) and the computer bus (PSB) on the other, is organized by a microprocessor (CPU), as is the conversion of control blocks used on the computer bus into those used in the link.

54 Claims, 6 Drawing Sheets

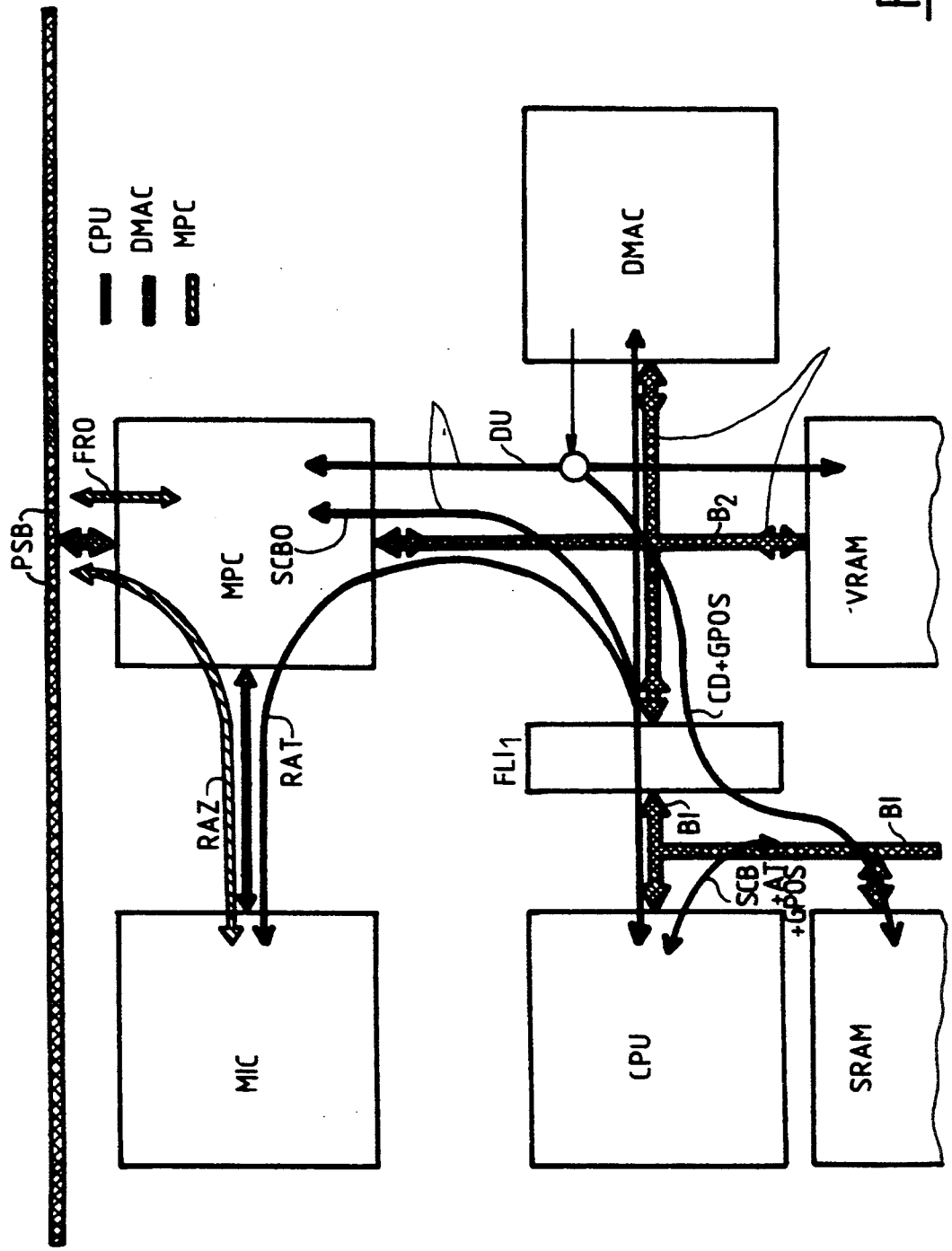

UNIVERSAL DEVICE FOR COUPLING A COMPUTER BUS TO A CONTROLLER OF A GROUP OF PERIPHERALS

CROSS REFERENCE TO RELATED APPLICATION

This application is related to U.S. application Ser. No. 07/913,366, filed Jul. 15, 1992, in the names of Marc Vasseur and Paul Ravaux, assigned to the assignee of the present invention and corresponding to French application 91.08907. The subject matter of said U.S. application is hereby incorporated by reference.

BACKGROUND OF THE INVENTION

The present invention relates to a universal device for coupling a computer bus to a controller of a group of peripherals, which are connected to one another by a specific link to which the controller is physically connected. More particularly, it is applicable to a group of peripherals or terminals that are connected to one another via an FDDI-type of ring network for data transmission, whose transmission carrier is constituted by optical fibers. It is also applicable to a group of peripherals connected to one another by a link characteristic to them, such as an SCSI-type link that connects magnetic disk memories.

Data transmission networks that use fiber optics as transmission carriers are used increasingly often and are defined in their broad outlines in the publications developed in such international standardization committees as the American National Standards Institute (ANSI), under reference number X3T9-5. These standards defined by ANSI have also been adopted by ISO, the International Standards Organization. This standard defines a set of physical and electrical characteristics of the network, such as the maximum total length of the fiber, the maximum distance between stations of a network, and the code in which the information is written and transmitted from one station to another. One of the numerous advantages of using fiber optics in the networks is the increased transmission rate obtained, which in on the order of 100 megabits per second.

SCSI-type links have also been defined by standards, both by ANSI and by ISO.

It is known that in a network, the information messages sent by the various stations are constituted by a plurality of frames. Hence the frame is the individual message and is structured; it includes messages marking the start and end, respectively; synchronization signals, from which the clock can be deduced; the address of the station to which a message is addressed; the address of the sending station; the length of the data; the useful data; and so forth. More simply, a frame can be said to be made up of useful data, are framed in time by signals placed at the head and foot of the frame. The signals at the head and foot of the frame that frame the useful data are called "command characters".

It is also known that the set of constituent functional elements of a computer, whether they are processors constituting it (central processing unity or input/output processors), random access and read only memories, input/output controllers or peripheral controllers, are disposed on a set of boards of standardized dimensions. These boards are generally connected to the same parallel-type bus, assuring communication among the various processors, data transport between the boards, and the electrical supply to the boards.

The bus commonly known as the Multibus II (trademark filed by the Intel Corporation) is one of the most often used buses. Its architecture is structured around a main bus of the parallel type, which is standardized to the IEEE (Institute of Electrical and Electronic Engineers) Standard 1296, and is commonly known as PSB (for parallel system bus).

One such computer bus is connected to this specific link (FDDI network or SCSI link) by way of a gateway connection device, whose function is to adapt the information transmission conditions on the Multibus II to the transmission conditions on the network or in the characteristic link connecting the peripherals. In fact, the data transmission modes on the PSB bus on the one hand and on the network (such as FDDI) on the other are completely different, both as to the information transmission rate and as to the transmission particles used, the writing codes, the information, the format, the control characters, the information transmission (parallel on the Multibus II, serial on the FDDI network), and so forth.

FIGS. 1A and 1B, respectively, show the general structure of such a gateway device, when the transmission network is the FDDI type, and when the characteristic link is the SCSI type.

Turning to FIG. 1A:

This shows a computer ORD, whose various constituent elements are disposed on a plurality of boards C communicating with one another by way of a bus PSB. Each board C is connected to PSB by way of an MPC coprocessor, for example an Intel VL 82c389, and communicates by message mode with the other constituent functional elements of the computer. This mode of communications between the various boards of ORD is defined precisely in aforementioned IEEE Standard 1296.

The computer ORD is connected to a network RN, in the form of a ring, of the FDDI type, by way of the gateway connection device DPC. The network RN is made up of a main ring AP and a secondary ring AS.

The device DPC is composed on the one hand of a universal coupling device GPU (for general purpose unit), an adaptor device DEA, and an interface IHA assuring the transfer of information between the universal coupling device GPU and the adaptor device DEA.

The universal coupling device GPU is connected to PSB via a coprocessor MPC, of the same type as the coprocessors of the boards C of the computer ORD.

The device DPC is physically connected to the network RN by way of a physical network access device, DAP, which belongs to the adaptor device DEA.

In FIG. 1B, the gateway connection device DPC has the same structure as in FIG. 1A; the difference is that the adaptor device DEA is connected by way of a physical adaptation device DAP to a link of the SCSI type, to which the respective disk memories $D_1, \ldots, D_i, \ldots, D_j, \ldots, D_n$ are connected.

Both in FIG. 1A and in FIG. 1B, the device DPC may be embodied by either one and the same board or by two separate boards, depending on the importance of the elements making up each of the constituents of this device, that is, GPU and DEA.

The general structure of the device DPC shown in FIGS. 1A and 1B, and embodiments and the function of the two elements constituting it, that is, GPU and DEA, are described in French Patent Application 89 10 156 filed on Jul. 27, 1989 by the present Applicant, entitled "Dispositif passerelle de connexion d'un bus d'ordinateur à un réseau fibre optique en forme d'anneau" corresponding to U.S. application Ser. No. 07/557,519, filed Jul. 4, 1990, entitled "Gateway Device for Connecting a Computer Bus to a Fiber-optic Token-ring Network". The subject matter of said U.S. application is hereby incorporated by reference.

The invention essentially relates to the universal coupling device GPU; the essential constituent elements of the universal coupling device GPUA that are used in the device DPC described in the aforementioned patent application will be recalled by reference to FIG. 2; this device accordingly constitutes a prior art way of embodying such a universal coupling device.

As can be seen from this same FIG. 2, the device GPUA is constructed around a microprocessor CPU and a bus BH associated with the microprocessor. It also includes a programmable read-only memory MM and a random access memory MV, and a direct memory access controller of the DMA type, represented by the symbol DMAC, for the random access memory MV.

In addition, the transfer interface IHA connected to the universal device GPUA by way of the bus BH includes an interface IHAD enabling the transfer of the useful data from or to GPUA and a transfer interface for the control blocks, including the command characters of the frames received or sent, that is, IHAC enabling the transfer of the control blocks from or to GPUA.

If one seeks to send information from the computer ORD to the network RN via PSB, then one proceeds as follows:

This information is transmitted via the coprocessor MPC and then memorized in the memory MV, and then analyzed by the microprocessor CPU, which processes a control block SCB containing parameters relating to the constitution of the FDDI-type frames, on the one hand, which are intended to be sent over the network RN (command characters), and on the other, relating to the nature of the operations to be performed by DEA. For example, these parameters are the address of the addressee of the information, the address of the sender, the length of the messages that are sent, and so forth.

As soon as CPU has constituted SCB, the latter is then sent, as are the data corresponding to it, over the bus BH to the interface IHA; SCB is routed to IHAC, while the data are routed to IHAD. The control block SCB is for example routed over 16 bits, that is, $HC_0$ through $HC_{15}$, accompanied by two parity bits $HCP_0$ and $HCP_1$. As for the data, they are routed over 32 bits, that is, $HD_0$ through $HD_{31}$, accompanied by four parity bits $HDP_0$ through $HDP_3$.

Both the data and the command block SCB are temporarily stored in their respective interfaces IHAC and IHAD before being transferred over the bus BC and BDF, respectively, which belong to the adaptor device DEA.

It is suitable to note that the transfer of the control blocks and data over the two separate buses BC and BDF is done independently for one and the other. The way in which the information is transferred and stored, before being sent over the network RN, via the adaptor device DEA is described in detail in the aforementioned French patent application.

The disadvantage of the universal coupling device GPUA is that the microprocessor has only one and the same bus at its disposal to perform the transfer of the useful data, the transfer of the data necessary for the running of its own code, and finally the data necessary for management of the protocols used on the bus PSB and in the network FDDI, respectively. It is not possible to make the best use of the microprocessor performance, because it is limited by the existence of only one bus.

The present invention makes it possible to overcome these disadvantages, by providing a double-port video RAM memory between the interface IHAD and the coprocessor MPC, in which memory the useful data of the FDDI (or SCSI) frames are temporarily stored before being transferred to the coprocessor MPC under the control of a controller of the DMA type. In addition, the microprocessor can use its internal bus specifically for running its own code, that is, for the data necessary for its operating system, and finally for managing protocols. The data can accordingly be transferred while at the same time work is done on the adaptation of the protocols, or while the operating system operations are being performed.

According to the invention, the universal device for coupling a computer bus to a controller of a group of peripherals connected to one another by a specific link to which the controller is physically connected, including:

a microprocessor associated with at least one memory containing its own operating system, an interface for linkage with the controller assuring the transfer of the useful data of the frames and control blocks containing the command characters relating to the constitution of frames transmitted either to the link or to the bus, is characterized in that it includes a double-port random-access buffer memory connected by way of a first bus to said interface and by way of a second bus to the computer bus via a specific interface of the computer, the transfer of the data between the linking interface and the double-port memory, on the one hand, between the latter and the computer bus on the other, being organized by the microprocessor, the latter transfer being effected under the control of a direct memory access circuit, and the conversion of the specific command characters of the protocols used on the computer bus into those used on the link and vice versa being performed by the microprocessor, which assures their transfer over its internal bus to or from the linking interface.

BRIEF DESCRIPTION OF THE DRAWINGS

Further characteristics and advantages of the present invention will become apparent in the ensuing detailed description given by way of non-limiting example, in conjunction with the drawings.

In the drawings:

FIG. 6 shows the various possible data paths between the various constituent elements of the universal coupling device according to the invention.

Turning now to FIG. 3:

The universal coupling device GPUI according to the invention includes the following various essential constituent elements:

the coprocessor MPC, which acts as an interface with the parallel bus PCB;

the microcontroller MIC, supporting the interconnection or "interconnect" function of the Multibus II;

the microprocessor CPU, which is in fact the central processing unit of the device GPUI, provided with its internal bus BI and associated with an eraseable programmable memory $EPROM_1$, a random-access memory SRAM, and an interrupt manager MFP, respectively. The elements $EPROM_1$, SRAM, and MFP are all connected to the internal bus BI of the microprocessor CPU, which is also connected to the interface IHAC;

the double-port memory of the video RAM type, with the reference symbol VRAM;

the direct memory access controller DMAC, which is connected to the bus $B_2$ connecting VRAM to the coprocessor MPC;

the bus $B_1$ connecting the interface IHAD to the memory VRAM.

Figure 2:
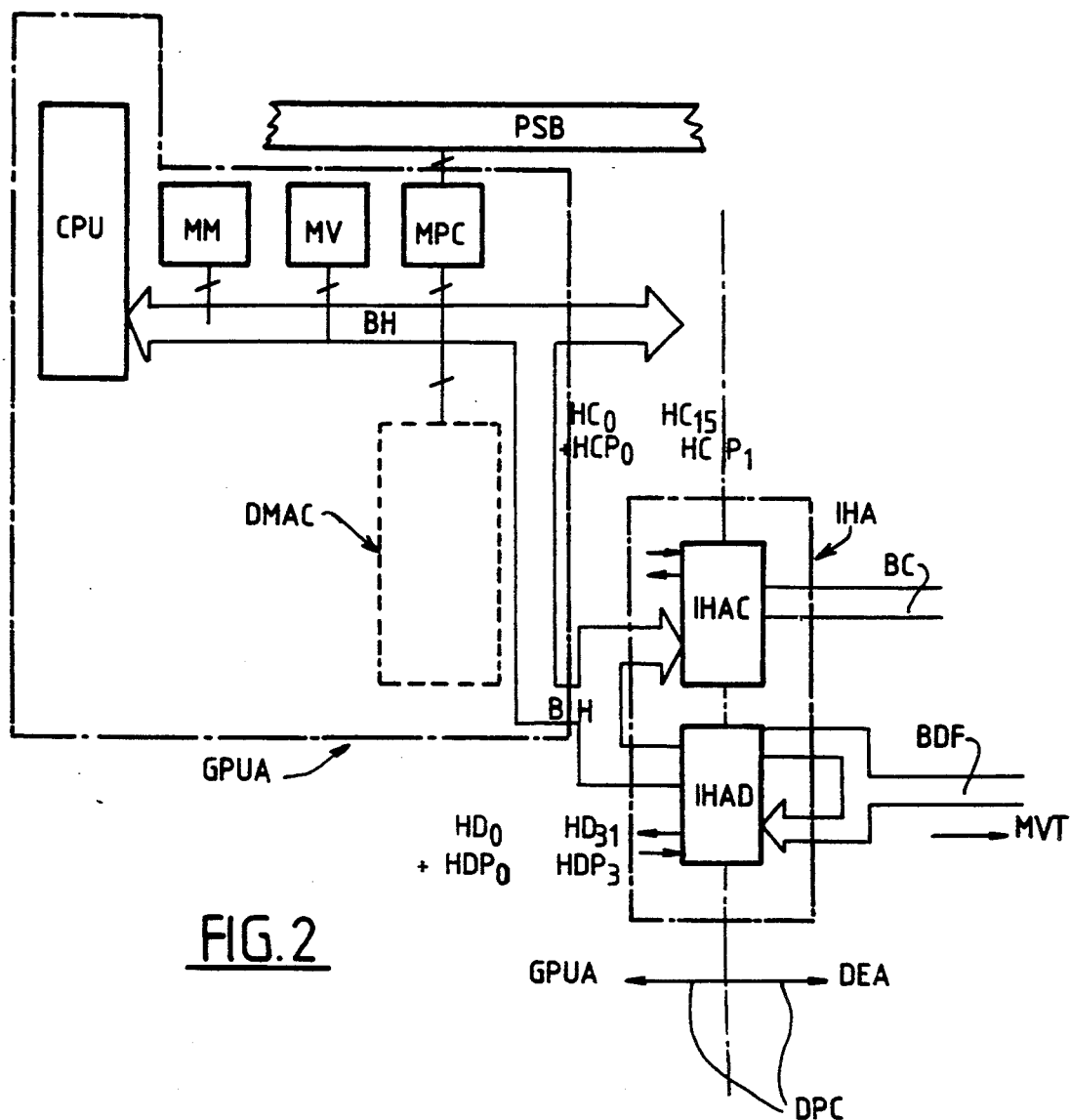
FIG. 2 shows the various constituent element of a universal coupling device according to the prior art, as described in the aforementioned French patent application.
Figure 3:
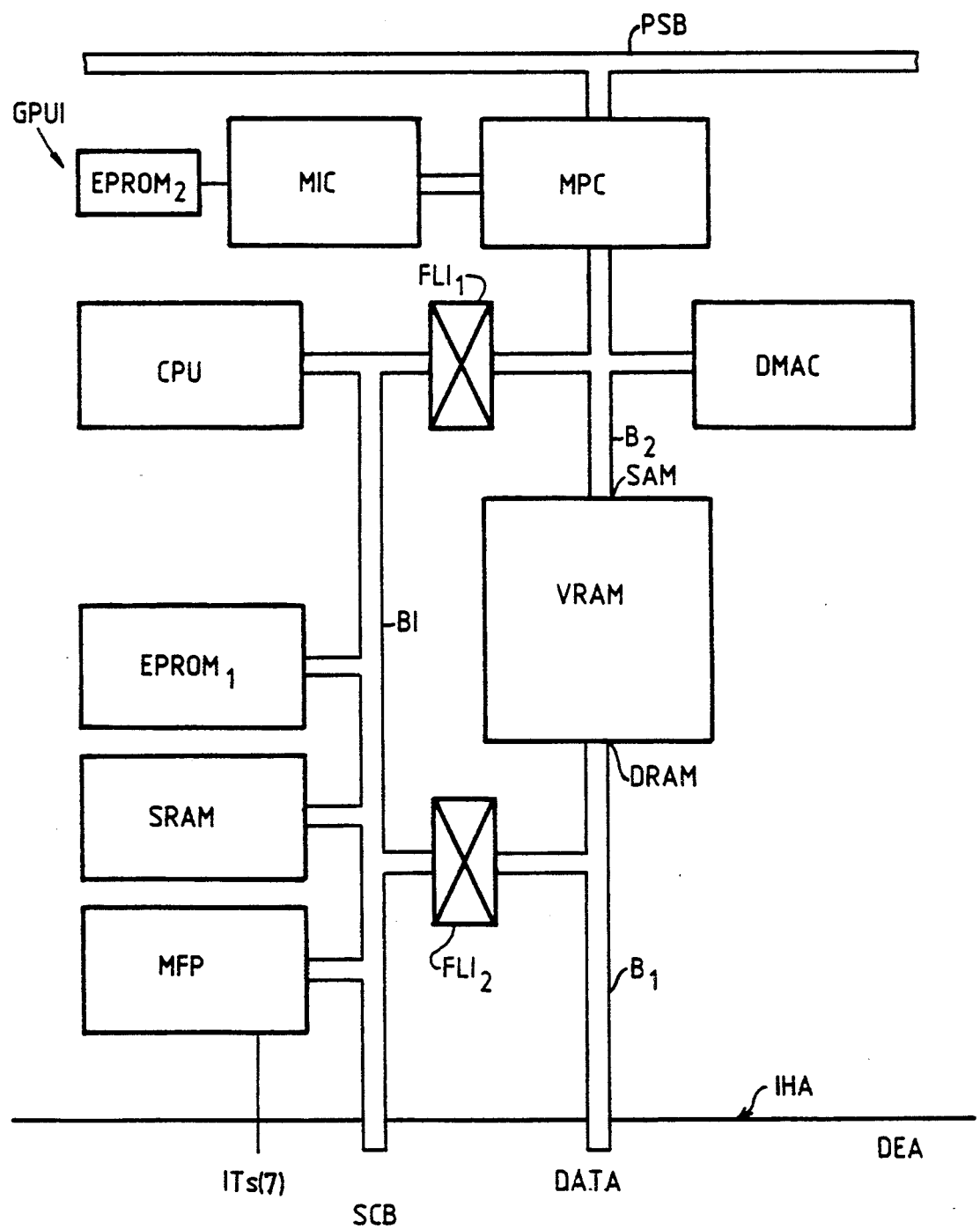
FIG. 3 shows the various essential constituent elements of the universal coupling device according to the invention.

In FIG. 3, the interface IHA, which is strictly identical with that shown in FIG. 2, is represented by a dotted line.

The coprocessor MPC is the same type as that described in conjunction with FIG. 2 and hence is designed especially to meet the aforementioned IEEE standard.

In the exemplary embodiment selected, the microcontroller MIC is constituted by an Intel 8752 element. This element was designed by Intel to work in close relationship with the coprocessor MPC to which it is connected, as can be seen in FIG. 3.

It manages everything relating to the interconnect space of the Multibus II and everything considered to be housekeeping (MB II), all of this set of functions (interconnection plus housekeeping) being defined by the aforementioned IEEE Standard 1296.

It should be noted that MIC can effect the interconnection on the demand of its own microprocessor CPU or on the demand of the microprocessor of some other GPUI-type board connected to the same PSB.

The memory $EPROM_2$ associated with the microcontroller MIC is an eraseable read-only memory and contains the reference numeral for the board that carries GPUI, or in other words its number as indicated in the factory at the time of its manufacture, and the revision number thereof, or in other words the number of the version it represents; the board carrying GPUI can in fact undergo modifications in manufacture over the course of time. Corresponding to each of these modifications is a predetermined version, whose number is recorded in the memory $EPROM_2$. It is understood that the microcontroller takes account of this information in order to implement its interconnect space.

In the preferred exemplary embodiment described here, the microprocessor CPU is of the Motorola 68020 type. This is a 32-bit microprocessor with a clock speed of 25 MHz. It manages its internal bus BI, which is a non-multiplexed bus with 32 data bits and 32 address bits.

The erasable read-only memory $EPROM_1$, with a capacity of 128 or 256 kilobytes, contains the self-testing and initialization programs of the coupling device GPUI.

The operating system GPOS of the microprocessor CPU is contained in the static memory SRAM, which has a capacity of 512 kilobytes or one megabyte. A protection system is associated with this memory for regulating access to it, and it will be described below in conjunction with FIG. 5.

The operating system GPOS organizes the operation of the entire microprocessor, and consequently supervises the transfer of frames from the bus PSB to the interface IHA and vice versa. In addition, the program (or programs) for adaptation of the protocols used, on the one hand between the computer ORD and the coupling device via the bus PSB, and on the other in the network RN (FDDI, SCSI, etc.), may be contained in the memory $EPROM_1$, or in SRAM, depending on its (or their) importance and the available capacity in one or the other of the memories.

Accordingly, the microprocessor CPU is the brain of the coupling device: It initializes the transfer of data, performs protocol adaptation, executes its code, and transfers the data between DEA and the computer ORD and vice versa, while being in dialog with DEA, with which it exchanges commands and states, for example in the manner indicated in the aforementioned French Patent Application and its U.S. equivalent.

The element MFP or multifunction peripheral is what is known as a "peripheral" of the microprocessor CPU. By way of example, it is a Motorola 68901 and is adapted to this microprocessor by construction. It handles a certain number of functions necessary for the operation of the latter. Examples are some of the management of the interruptions necessary for it. Other examples are clock frequencies, for example used by its operating system. By construction, the 68020 microprocessor has seven levels of interruption, which is not enough to perform all the operations it is tasked with. The element MFP furnishes 16 additional interruption levels in all, eight of them for the CPU and the other eight for external devices (of which seven are for the adaptor device DEA).

The direct memory access controller DMAC assures the transfer of data between the coprocessor MPC and one of the two memories SRAM or VRAM. It has two channels:

one channel called "channel in" assuring the transfer of data from the coprocessor MPC to the double-access or double port video RAM memory VRAM (or to SRAM), and one channel called "channel out" assuring the transfer of the data from the memory VRAM to the coprocessor MPC.

The channel "in" has priority over the channel "out", and it interrupts the latter when it receives a transfer request. The speed of transfer of the controller DMA depends on the performance sought for the universal coupling device of the invention, and it may be as high as 33.3 megabytes in a single cycle mode, which enables saturating the PSB with 32 megabytes per second (32 mega octets).

The transfer of data is done in successive packets of $8 \times 32$ bits, on the request of the coprocessor MPC (both for the "in" channel and for the "out" channel). To perform a data transfer, the controller DMAC receives, from the microprocessor CPU, a starting address (in VRAM or in the coprocessor MPC), a count, in other words the number of bytes to be transferred and a starting order for the transfer of data. As soon as it has received this information from CPU, DMAC organizes this data transfer. It is accordingly the slave of the microprocessor CPU, for the information giving the address and the count. The controller DMAC does not see the data that pass from the memory to the coprocessor and vice versa. It need control only the routing of these data on the request of the coprocessor MPC.

The video RAM VRAM is a dynamic, double-port memory whose capacity is on the order of one to two megabytes over a width of 32 bits. One of the two ports, that is, SAM, is reserved exclusively for the controller DMAC, while the second port, DRAM, is shared between the microprocessor CPU and the adaptor device DEA. This memory serves as a buffer for the data that pass between GPU and the adaptor device DEA. The video RAM is protected by a parity control, with 1 parity bit per 8-bit byte. It should be noted that the microprocessor CPU or the adaptor device DEA can access VRAM while DMAC is performing a data transfer between VRAM and MPC. This is done under certain conditions: The controller DMAC does not work directly in the video RAM memory but rather in a register of its own containing one page of memory, the latter being cut into several pages; thus in the exemplary embodiment selected, the memory VRAM contains 512 pages of 512 lines, each including 32 bits. In writing, DMAC first recopies one page of the memory VRAM into its own register, then modifies its register with the data that have been transmitted to it by the coprocessor, and finally it recopies its register into this memory page, erasing the previous data that had been recorded there. This naturally requires very strict management of the memory VRAM, so that the microprocessor CPU and the adaptor device DEA will not work on the same pages as DMAC at the same time.

The bus $B_1$ and the bus $B_2$ are 32-bit data and address buses (32 address bits, 32 data bits). It can be seen that the microprocessor CPU can control the three buses BI, $B_1$, $B_2$. It accesses the coprocessor MPC and the controllers DMA, DMAC by way of the bus $B_2$. It accesses the memory VRAM by way of the bus $B_1$.

The controller DMAC can reach the memory SRAM by way of the bus BI (this is done particularly upon the transfer of the code and data of the software GPOS, until the initialization of the device GPUI according to the invention). From the adaptor device DEA, access to the bus BI is not possible from the bus $B_1$. Similarly, any transfer of useful data carried over the bus $B_2$ cannot travel over BI. These two impossibilities are symbolized by the existence of the elements $FLI_1$ and $FLI_2$, disposed between the bus $B_2$ and the bus BI, and between the bus $B_1$ and BI, respectively. These elements are logical isolation (or inhibition) elements.

The controller DMAC always has priority over the microprocessor CPU, while on the bus $B_1$, the control elements of the adaptor device DEA (see the aforementioned French patent application) also have priority. Nevertheless, the microprocessor CPU can interrupt a transfer from $B_1$ or $B_2$ when this transfer is overly long, in order to allow the data that it wishes to have to travel over that bus.

In summary, it can be seen that the microprocessor CPU can work on its bus while the direct access controllers DMAC and the equivalent controllers of DEA are active on their respective data and address buses, that is, $B_2$ and $B_1$. In other words, the separation into three separate buses BI, $B_1$, $B_2$ makes it possible to perform three tasks simultaneously and completely asynchronously.

Figure 4:
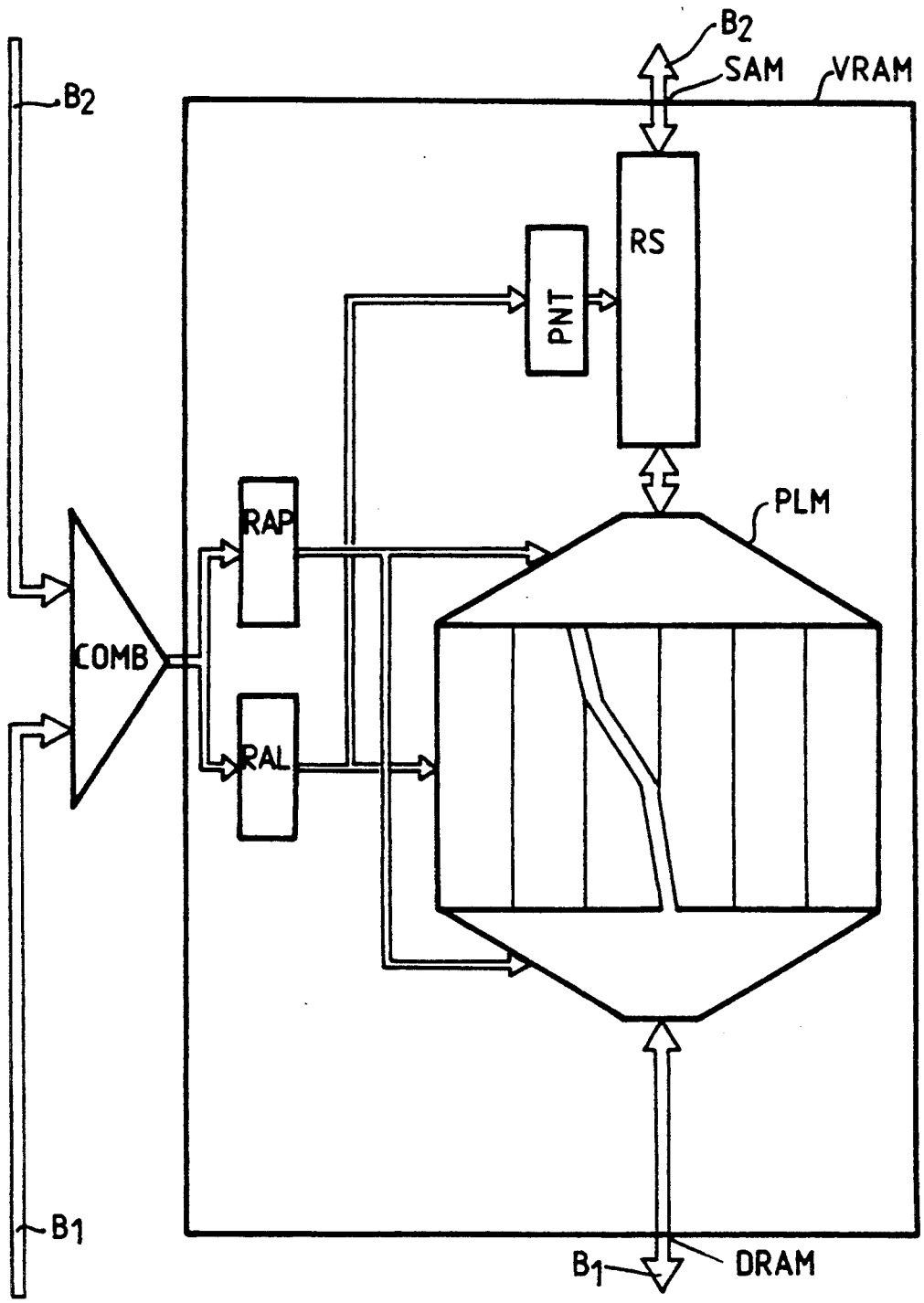
FIG. 4 in greater detail, shows how the double-port video RAM is constituted and how it is connected on the hand to the adaptor device and on the other to the coprocessor, which in turn is connected to the Multibus II.

Turning now to FIG. 4:

The various essential constituent elements of the double-access memory VRAM are:
the paginated memory zone per se, PLM;
the address/line register RAL;
the address/page register RAP;
the serial output register $RS_1$, associated with the pointer PNT.

As noted above, the first port, DRAM, is connected to the bus $B_1$ (data bus), while the second port, SAM, is connected to the data bus $B_2$.

The paginated memory zone PLM is addressed by the address register RAP, with respect to addressing of each of the 512 pages of PLM, and by the address register RAL with respect to each of the 512 lines of a predetermined page.

In addition, the line address register RAL is connected to the pointer PNT.

The address bus $B_1$ and the address bus $B_2$ originating in the adaptor device DEA and in the controller DMAC, respectively, are connected to the respective two address registers RAP and RAL by way of a combination circuit COMB, which may simply be an OR gate.

The serial register RS, which is connected on the one hand to the data bus $B_2$ and on the other to the zone PLM, is in fact composed of 32 serial registers, each including 512 different positions, so that the entire register RS can contain one complete page of the zone PLM, with the pointer PNT making it possible to transmit each of the 512 lines of 32 bits of one page of this same memory zone, one after the other.

More details on the constitution and function of a double-port memory of the video RAM type are provided, for example, in the technical notice published by Toshiba on the video RAM memory TC 524256, for instance the package type Z-10-.

Figure 5:
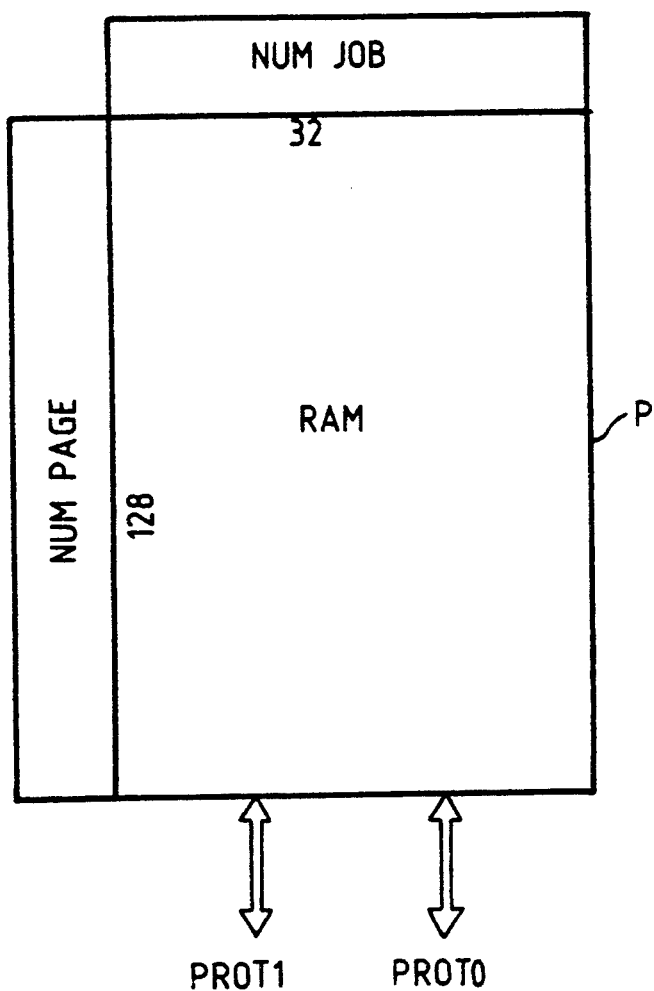
FIG. 5 shows how access is gained to the various stages of the RAM-type memory associated with the microprocessor of the coupling device according to the invention.

Turning now to FIG. 5, the protection system RAMP of the memory SRAM constituted by a RAM-type memory, is shown. SRAM is cut into 128 pages of 8 kilobytes each, for example. In addition, the operating software GPOS of the microprocessor CPU has 32 application numbers available (each application is also known as a job). The memory protection is contained in the 32 by 128-bit RAMP memory, and it is done per page and per application number. It is defined by a set of two bits $PROT_1$, $PROT_0$, whose combination defines a certain number of possible operations on one or another predetermined page of the memory SRAM. Thus if bit $PROT_1 = 0$, then regardless of the value of $PROT_0$, then access to the page having the predetermined number, by a predetermined application, is impossible. If bit $PROT_1 = 1$ while $PROT_0 = 0$, then this same page can be read. When the two bits $PROT_1$ and $PROT_0$ are simultaneously equal to 1, both reading and writing of the page in question are authorized.

Hence a pair of well-defined values $PROT_1$ and $PROT_0$ correspond to each predetermined job number NUMJOB and each page number NUMPAG for it.

The set of these pairs NUMJOB and NUMPAG is recorded in a table and is known by a hardware logic circuit (not shown for the sake of simplification in FIGS. 3 and 5). When the operating system wishes access to a page in SRAM defined by a predetermined pair NUMPAG-NUMJOB, it sends this hardware logic circuit a pair of values $SPROT_1$-$SPROT_0$, which is compared by this circuit to $PROT_1$-$PROT_0$. The latter either does or does not authorize access to the page in question, as function of the results of this comparison.

Turning now to FIG. 6, the various data paths for each of the essential constituent elements of the universal coupling device of the invention are summarized.

Figure 1:
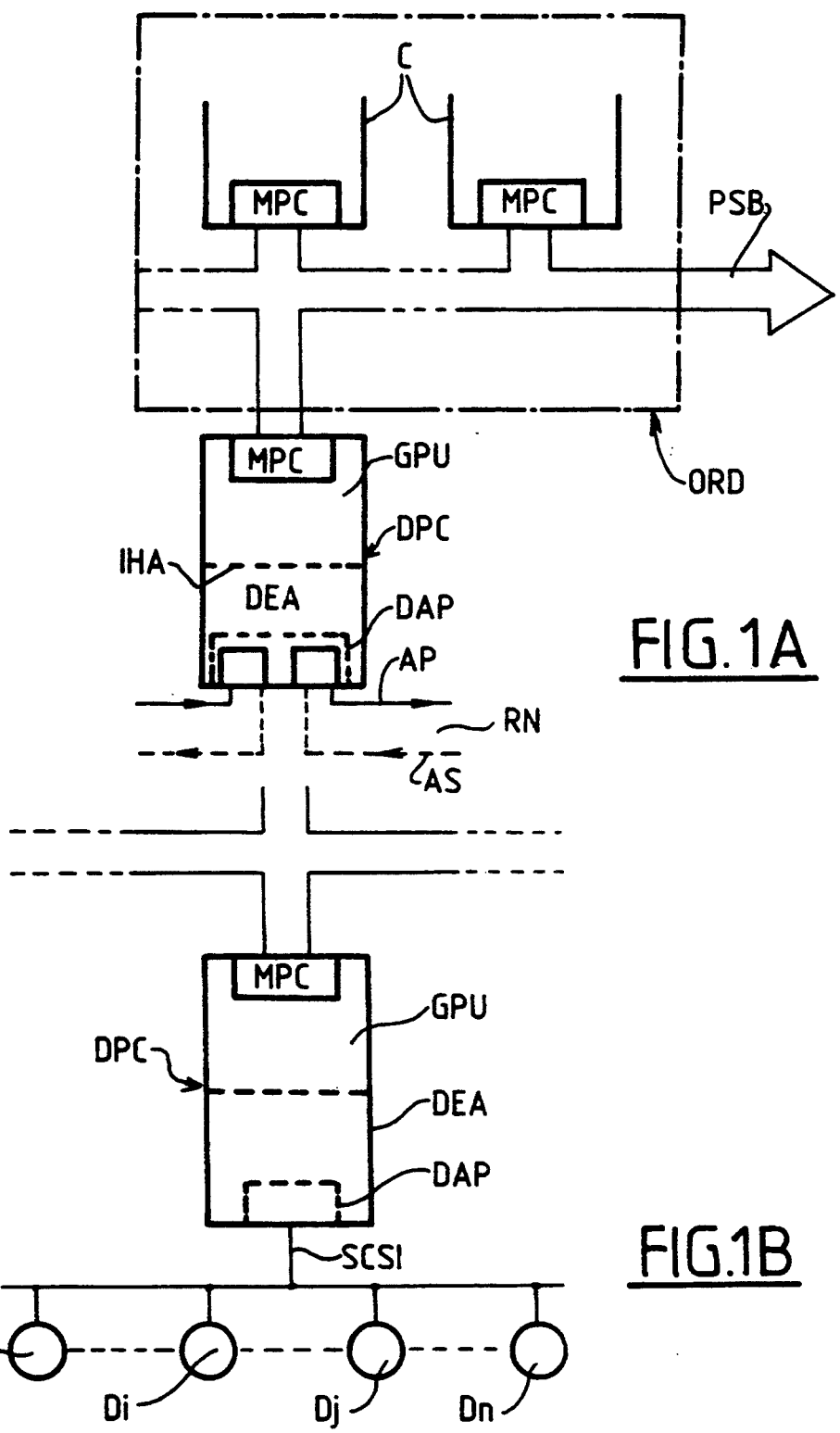
FIG. 1, composed of FIG. 1A and 1B, shows how a computer is connected to either an FDDI-type network or an SCSI-type link.

It is understood that in FIG. 6, the term data path means the routes by which any type of data travel, whether they are useful data intended to be transmitted over the network RN of FIG. 1a, or the control blocks, or the data of the operating software GPOS, or the data of the self-test program.

In FIG. 6, the data paths controlled by CPU, DMAC and MPC are shown. The thick line cross-hatched in black and white represents the real, physical path of the data (the physical bus B1, BI) while the thinner lines symbolize the directions assumed by the same data paths. Those controlled by the coprocessor MPC have been shown in slanting alternating black and white lines, and these controls by the controller DMAC have been shown in black and white cross-hatched lines.

Turning now to the data paths controlled by CPU, these are, first, those located between the CPU and the memory SRAM or the memory EPROM, which travel over the bus BI and relate to either the command blocks SCB, the test programs AT, or the operating system GPOS. CPU controls the path of data proceeding to the microcontroller MIC, over which the results of the self-tests and all the data necessary for management of the interconnect space of PSB travel.

The microprocessor CPU controls the path of data between the coprocessor MPC and itself, which travel over BI, $FLI_1$ and $B_2$, concerning the command blocks relating to the various frames originating in the computer ORD. These command blocks, here represented by the symbol SCBO, are different from the command blocks SCB. It is precisely the role of CPU to convert the command blocks SCBO into command blocks SCB, taking account of the various protocols used between the computer ORD and GPUI, via PSB on the one hand and in the network RN on the other.

Turning now to the paths of data controlled by the controller DMAC, these are, first, the path of the data transporting the useful data of the frames addressed to the network or addressed to the computer ORD, these useful data being designated by the symbol DU and traveling over the bus $B_2$ (data bus). In addition, the controller DMAC controls a path of data traveling on the one hand by $B_2$ and then by $FLI_1$, and by BI, and proceeding to the memory SRAM. This is the path by which the data constituting GPOS travel.

Turning now to the paths of data controlled by the coprocessor MPC, these are, first, the path of data carrying the frames originating in the computer ORD, or some other computer or universal coupling device connected to PSB, and designated by the symbol FRO and occupying PSB. These paths also include the path of data transmitted by the computer to the microcontroller MIC via PSB at the time of the interconnect and reset to zero operations of each of the elements of the board carrying GPUI, and in this case designated by the symbol RAZ.

The operation of the device GPUI according to the invention is as follows:

Operation $OP_1$:

Initially, the microcontroller MIC releases the microprocessor CPU and allows it to start up. The latter begins by employing the self-test programs contained in the memory $EPROM_1$. If the self-tests prove correct, the microprocessor controls the operations of initialization of the board, which are performed by the microcontroller MIC. The various constituent elements of GPUI are then in their proper operating state.

Operation $OP_2$:

Under the control of DMAC, the operating system GPOS is loaded into the memory SRAM. Once this has been done, CPU can employ it to control all the operations performed by GPUI. One exemplary embodiment of this operating system is for instance described in the French patent application, filed on the same date as the present application, by the present Applicant and entitled: "Système d'exploitation pour dispositif universel de couplage d'un bus d'ordinateur à au moins une liason spécifique d'un réseau" [Operating System for a Universal Device for Coupling a Computer Bus to at Least One Specific Link of a Network], and its U.S. equivalent. One can then proceed to the next operation.

Operation $OP_3$:

This relates to the transmission or reception of frames proceeding to or originating in the network.

First transmission will be considered, that is, sending information from the computer ORD to the network RN. In this context, the computer is the initiator of the process. It should be noted that in its memories, the computer has memory zones, more commonly called buffers, in which the frames intended to be sent to the network RN are memorized before their transmission. In current practice, the computer ORD has several memory zones $BF_1$, $BF_2$, ..., $BF_m$. Each of these zones or buffers generally includes frames intended to be sent to a network that uses a given protocol. These frames may be sent by the Ethernet, TCP-IP, FDDI, or other protocols. It is assumed here that the buffer $BF_1$, for instance, contains the frames intended for network, such as FDDI.

The operation proceeds then in the following order:
1: The computer ORD sends an interruption $IT_1$ to the microprocessor CPU, which wakes up the latter. This interruption alerts the microprocessor that the computer ORD is about to send a plurality of frames to the network RN, for example n frames. The device GPUI then performs n iterations, each including the following operations 2-5:
2: The microprocessor, under the control of its operating system GPOS, looks in the memory of the computer ORD for the address in the buffer $BF_1$ of the beginning of the frame to be sent, and for its length.
3: The microprocessor then looks in the buffer $BF_1$ for the frame in question, here symbolized by $TR_1$. It places it in the memory VRAM, with respect to the useful data, by way of PSB of the coprocessor MPC, and thanks to the controller DMAC, which organizes the transfer of these data from the coprocessor to VRAM. As for the command blocks SCBO, they are sent to the random-access memory SRAM via PSB, MPC, B₂ and BI.

It should be noted that for operations 2 and 3 performed under the control of GPOS, the information is transmitted from the computer to the microprocessor by a transmission protocol that is specific to the computer in question. In the exemplary embodiment chosen, this protocol is a protocol known as PLANET, which is described in French Patent Application 2 633 414 filed by the present applicant and entitled "Système informatique à interconnexion centrale". (Information Processing System with Central Interconnection), to which U.S. patent application Ser. No. 07/369,333 corresponds. The subject matter of said U.S. application is incorporated herein by reference.

One then proceeds to operation 4:

4: The microprocessor CPU performs the adaptation of the protocols between the protocol PLANET and the protocol of the FDDI type used in the network RN. Beginning with the command blocks SCBO, this amounts to constituting the command blocks SCB, as described in the aforementioned French patent application and its U.S. equivalent, and cutting the frame $TR_1$ into a plurality of frames TDDI, whose length corresponds to the format of the corresponding protocol.

5: The microprocessor CPU loads the useful data into the interface IHAD and the command block SCB into IDAC in succession. A dialog then begins between CPU and the adaptor device DEA, in accordance with the flowcharts described in the aforementioned French patent application, in such a manner to cause the frames to travel from DEA to the network RN.

A return is then made to operation 2 for the next frame $TR_2$ intended to be transmitted from $BF_1$ to the network RN.

Once the frame $TR_n$ is loaded by CPU into the two interfaces IHAD and IHAC, then if there are no longer any frames to be sent from $BF_1$, the microprocessor CPU either goes to an inactive state with respect to the transmission of frames relating to $BF_1$ or begins to organize the transmission of frames from some other buffer $BF_2, \ldots, BF_m$.

B. Frame reception:

Once again, the computer ORD is the initiator of the operations. Reception includes the following operations 6–11:

6: The computer ORD sends an interruption $IT_2$, which indicates to the microprocessor CPU that a buffer $BF'_1$ is at the disposal of the microprocessor for storing frames in it that originate in the network RN. It is clear that with another interruption, the computer ORD may indicate to the microprocessor CPU that a buffer $BF'_2$, $BF'_3$, and so forth is at its disposal for storing frames there that originate in different networks of RN. In current practice, the two buffers $BF_1$ and $BF'_1$ belong to the same memory zone, which is in fact divided in two, that is, $BF_1$ for transmission and $BF'_1$ for reception of frames.

7: The microprocessor CPU restarts and then, in the memory of ORD assigned to that purpose, it looks for the address and length of the buffer $BF'_1$ and assumes the waiting position until it receives an interruption $IT_3$ from DEA. CPU then reads the contents of the interface IHAC and confirms there that a frame originating in the network RN is available to be received by the computer ORD. This frame $TR'_1$ is located in the interface IHAD.

8: The microprocessor CPU empties the interface IHAD of the useful data located there and transfers them to the memory VRAM. It transfers the command blocks from IHAC to the memory SRAM.

9: a) CPU performs the protocol adjustment by converting the command block SCB into a command block SCBO.

b) It analyzes the protocol of the frame received, as defined in the command block SCB, to determine which type of buffer of the memory of the computer ORD the frame should go to. Once this has been done, one proceeds to operation 10.

10: CPU performs the transfer of the command block SCBO to the computer ORD via MPC and PSB, and simultaneously starts the controller DMAC, so that the latter transfers the useful data of the frame $TR'_1$ that are contained in the memory VRAM to the buffer $BF'_1$. Once this transfer has been completed, a return is made to either operation 7, if a frame $TR'_2$ originating in the network RN is to be received, or to operation 6, if a frame originating in some other type of network and intended for some other buffer than $BF'_1$ is involved.

It is understood that the computer ORD receives a signal from the microprocessor CPU that tells it that a frame is on its way to it.

When the microprocessor has filled all the buffers $BF'_1$, $BF'_2$, and so forth that have been put at its disposal by the computer ORD, it sends an interruption $IT_4$ to the computer ORD. This constitutes operation 11.

It should be noted that the transmission and reception of frames performed under the control of the microprocessor CPU are interlaced in time, and that the microprocessor, in the preferred exemplary embodiment described here, can manage 16 interlaced logical channels, that is, eight logical channels for reception and eight logical channels for transmission, each of these channels being capable of being assigned to a different type of buffer particular to the computer ORD.

In conclusion, it can be seen that the universal coupling device GPUI according to the invention can perform three simultaneous operations, that is, one transmission and one reception, over the bus $B_2$, by way of the controller DMAC, while the microprocessor CPU is working on a third operation (transmission or reception over a different channel). This assures high performance on the part of the device of the invention.

We claim:

1. A universal device for coupling a computer bus of a computer to a controller of a group of peripherals connected to one another by a specific link to which the controller is physically connected, said universal device including:

a microprocessor connected with at least one memory said microprocessor having an operating system, a controller interface for linkage with the controller enabling transfer of data defining frames and control blocks wherein said control blocks include command characters relating to the frames transferred to either the link or the bus, a double-port random-access buffer memory connected by way of a first bus to said controller interface and by way of a second bus to the computer bus via a specific interface of the computer, means for organizing transfer of data by the microprocessor between said controller interface and the double-port memory, and between the double-port memory and the computer bus, a direct memory access controller operatively connected between said double-port memory and the computer, said transfer of data being effected under control of said direct memory access controller, wherein conversion of control blocks of protocols used on the computer bus into those used on the link and vice versa is performed by the microprocessor, which enables a transfer of control blocks used on the link over an internal bus of the microprocessor to or from said controller interface.

2. The universal coupling device of claim 1, wherein the double-port memory includes a paginated memory zone including a plurality of pages each with a plurality of lines, an address/line register, an address/page register, a serial output register connected to the second bus and defining a second port of the double-port memory, a first port being connected to the first bus, the paginated memory zone being addressed by the address/page register for addressing each of said plurality of pages and by the address/line register with respect to each of said plurality of lines of a predetermined page, the first bus and the second bus being connected to the address/page and address/line registers, respectively, by way of a combination circuit, the serial output register including pointer means for enabling transfer, one after another, of each of said plurality of lines of a page of the paginated memory zone.

3. The universal coupling device of claim 2, wherein the direct memory access controller has a transfer speed greater than that of the computer bus, such that said direct memory access controller is operable to saturate the computer bus.

4. The universal coupling device of claim 3, further including logical isolation elements disposed between the first bus and the internal bus of the microprocessor, and between the second bus and the internal bus of the microprocessor, respectively, in such a way as to prevent any transfer of useful data carried on the first or second buses to the internal bus of the microprocessor.

5. The universal coupling device of claim 4, wherein the double-port memory includes a protection system including a random-access memory and a plurality of application numbers therein for use by the operating system of the microprocessor, wherein each of said application numbers corresponds to a page of the memory connected with the microprocessor, said protection system being defined by two bits whose combination defines a certain number of possible operations on any predetermined page of the memory connected with the microprocessor.

6. The universal coupling device of claim 5, wherein in double-port memory is a video RAM.

7. The universal coupling device of claim 6, wherein the microprocessor controls a path of data between a computer bus interface of the computer bus and the microprocessor, wherein control blocks including command characters relating to frames originating in the computer pass over the internal bus of the microprocessor, first logical isolation elements and the second bus, and the direct memory access controller controls a first path of useful data between said computer bus interface of the computer bus and the double-port memory, and a second path of data originating in said computer bus interface and traveling via the second bus, the first logical isolation elements and the computer bus in order to reach the memory connected with the microprocessor, said second path of data being used for data constituting the operating system of the microprocessor.

8. The universal coupling device of claim 23, wherein the microprocessor controls a path of data between a computer bus interface of the computer bus and the microprocessor, wherein control blocks including command characters relating to frames originating in the computer pass over the internal bus of the microprocessor, first logical isolation elements and the second bus, and the direct memory access controller controls a first path of useful data between said computer bus interface of the computer bus and the double-port memory, and a second path of data originating in said computer bus interface and traveling via the second bus, the first logical isolation elements and the computer bus in order to reach the memory connected with the microprocessor, said second path of data being used for data constituting the operating system of the microprocessor.

9. The universal coupling device of claim 4, wherein the double-port memory is a video RAM.

10. The universal coupling device of claim 9, wherein the microprocessor controls a path of data between a computer bus interface of the computer bus and the microprocessor, wherein control blocks including command characters relating to frames originating in the computer pass over the internal bus of the microprocessor, first logical isolation elements and the second bus, and the direct memory access controller controls a first path of useful data between said computer bus interface of the computer bus and the double-port memory, and a second path of data originating in said computer bus interface and traveling via the second bus, the first logical isolation elements and the computer bus in order to reach the memory connect with the microprocessor, said second path of data being used for data constituting the operating system of the microprocessor.

11. The universal coupling device of claim 4, wherein the microprocessor controls a path of data between a computer bus interface of the computer bus and the microprocessor, wherein control blocks including command characters relating to frames originating in the computer pass over the internal bus of the microprocessor, first logical isolation elements and the second bus, and the direct memory access controller controls a first path of useful data between said computer bus interface of the computer bus and the double-port memory, and a second path of data originating in said computer bus interface and traveling via the second bus, the first logical isolation elements and the computer bus in order to reach the memory connected with the microprocessor, said second path of data being used for data constituting the operating system of the microprocessor.

12. The universal coupling device of claim 3, wherein the double-port memory includes a protection system including a random-access memory and a plurality of application numbers therein for use by the operating system of the microprocessor, wherein each of said application numbers corresponds to a page of the memory connected with the microprocessor, said protection system being defined by two bits whose combination defines a certain number of possible operations on any predetermined page of the memory connected with the microprocessor.

13. The universal coupling device of claim 12 wherein the double-port memory is a video RAM.

14. The universal coupling device of claim 13, wherein the microprocessor controls a path of data between a computer bus interface of the computer bus and the microprocessor, wherein control blocks including command characters relating to frames originating in the computer pass over the internal bus of the microprocessor, first logical isolation elements and the second bus, and the direct memory access controller controls a first path of useful data between said computer bus interface of the computer bus and the double-port memory, and a second path of data originating in said computer bus interface and traveling via the second bus, the first logical isolation elements and the computer bus in order to reach the memory connected with the microprocessor, said second path of data being used for data constituting the operating system of the microprocessor.

15. The universal coupling device of claim 12, wherein the microprocessor controls a path of data between a computer bus interface of the computer bus and the microprocessor, wherein control blocks including command characters relating to frames originating in the computer pass over the internal bus of the microprocessor, first logical isolation elements and the second bus, and the direct memory access controller controls a first path of useful data between said computer bus interface of the computer bus and the double-port memory, and a second path of data originating in said computer bus interface and traveling via the second bus, the first logical isolation elements and the computer bus in order to reach the memory connected with the microprocessor, said second path of data being used for data constituting the operating system of the microprocessor.

16. The universal coupling device of claim 3, wherein the double-port memory is a video RAM.

17. The universal coupling device of claim 16, wherein the microprocessor controls a path of data between a computer bus interface of the computer bus and the microprocessor, wherein control blocks including command characters relating to frames originating in the computer pass over the internal bus of the microprocessor, first logical isolation elements and the second bus, and the direct memory access controller controls a first path of useful data between said computer bus interface of the computer bus and the double-port memory, and a second path of data originating in said computer bus interface and traveling via the second bus, the first logical isolation elements and the computer bus in order to reach the memory connected with the microprocessor, said second path of data being used for data constituting the operating system of the microprocessor.

18. The universal coupling device of claim 2, further comprising logical isolation elements disposed between the first bus and the internal bus of the microprocessor, and between the second bus and the internal bus of the microprocessor, respectively, in such a way as to prevent any transfer of useful data carried on the first or second buses to the internal bus of the microprocessor.

19. The universal coupling device of claim 18, wherein the double-port memory includes a protection system including a random-access memory and a plurality of application numbers therein for use by the operating system of the microprocessor, wherein each of said application numbers corresponds to a page of the memory connected with the microprocessor, said protection system being defined by two bits whose combination defines a certain number of possible operations on any predetermined page of the memory connected with the microprocessor.

20. The universal coupling device of claim 19, wherein the double-port memory is a video RAM.

21. The universal coupling device of claim 20, wherein the microprocessor controls a path of data between a computer bus interface of the computer bus and the microprocessor, wherein control blocks including command characters relating to frames originating in the computer pass over the internal bus of the microprocessor, first logical isolation elements and the second bus, and the direct memory access controller controls a first path of useful data between said computer bus interface of the computer bus and the double-port memory, and a second path of data originating in said computer bus interface and traveling via the second bus, the first logical isolation elements and the computer bus in order to reach the memory connected with the microprocessor, said second path of data being used for data constituting the operating system of the microprocessor.

22. The universal coupling device of claim 19, wherein the microprocessor controls a path of data between a computer bus interface of the computer bus and the microprocessor, wherein control blocks including command characters relating to frames originating in the computer pass over the internal bus of the microprocessor, first logical isolation elements and the second bus, and the direct memory access controller controls a first path of useful data between said computer bus interface of the computer bus and the double-port memory, and a second path of data originating in said computer bus interface and traveling via the second bus, the first logical isolation elements and the computer bus in order to reach the memory connected with the microprocessor, said second path of data being used for data constituting the operating system of the microprocessor.

23. The universal coupling device of claim 18, wherein the double-port memory is a video RAM.

24. The universal coupling device of claim 25, wherein the microprocessor controls a path of data between a computer bus interface of the computer bus and the microprocessor, wherein control blocks including command characters relating to frames originating in the computer pass over the internal bus of the microprocessor, first logical isolation elements and the second bus, and the direct memory access controller controls a first path of useful data between said computer bus interface of the computer bus and the double-port memory, and a second path of data originating in said computer bus interface and traveling via the second bus, the first logical isolation elements and the computer bus in order to reach the memory connected with the microprocessor, said second path of data being used for data constituting the operating system of the microprocessor.

25. The universal coupling device of claim 18, wherein the microprocessor controls a path of data between a computer bus interface of the computer bus and the microprocessor, wherein control blocks including command characters relating to frames originating in the computer pass over the internal bus of the microprocessor, first logical isolation elements and the second bus, and the direct memory access controller controls a first path of useful data between said computer bus interface of the computer bus and the double-port memory, and a second path of data originating in said computer bus interface and traveling via the second bus, the first logical isolation elements and the computer bus in order to reach the memory connected with the microprocessor, said second path of data being used for data constituting the operating system of the microprocessor.

26. The universal coupling device of claim 2, wherein the double-port memory is a video RAM.

27. The universal coupling device of claim 26, wherein the microprocessor controls a path of data between a computer bus interface of the computer bus and the microprocessor, wherein control blocks including command characters relating to frames originating in the computer pass over the internal bus of the microprocessor, first logical isolation elements and the second bus, and the direct memory access controller controls a first path of useful data between said computer bus interface of the computer bus and the double-port memory, and a second path of data originating in said computer bus interface and traveling via the second bus, the first logical isolation elements and the computer bus in order to reach the memory connected with the microprocessor, said second path of data being used for data constituting the operating system of the microprocessor.

28. The universal coupling device of claim 1, wherein the direct memory access controller has a transfer speed greater than that of the computer bus, such that said direct memory access controller is operable to saturate the computer bus.

29. The universal coupling device of claim 28, further comprising logic isolation elements disposed between the first bus and the internal bus of the microprocessor, and between the second bus and the internal bus of the microprocessor, respectively, in such a way as to prevent any transfer of useful data carried on the first or second buses to the internal bus of the microprocessor.

30. The universal coupling device of claim 29, wherein the double-port memory includes a protection system including a random-access memory and a plurality of application numbers therein for Use by the operating system of the microprocessor, wherein each of said application numbers corresponds to a page of the memory connected with the microprocessor, said protection system being defined by two bits whose combination defines a certain number of possible operations on any predetermined page of the memory connected with the microprocessor.

31. The universal coupling device of claim 30, wherein the double-port memory is a video RAM.

32. The universal coupling device of claim 31, wherein the microprocessor controls a path of data between a computer bus interface of the computer bus and the microprocessor, wherein control blocks including command characters relating to frames originating in the computer pass over the internal bus of the microprocessor, first logical isolation elements and the second bus, and the direct memory access controller controls a first path of useful data between said computer bus interface of the computer bus and the double-port memory, and a second path of data originating in said computer bus interface and traveling via the second bus, the first logical isolation elements and the computer bus in order to reach the memory connected with the microprocessor, said second path of data being used for data constituting the operating system of the microprocessor.

33. The universal coupling device of claim 30, wherein the microprocessor controls a path of data between a computer bus interface of the computer bus and the microprocessor, wherein control blocks including command characters relating to frames originating in the computer pass over the internal bus of the microprocessor, first logical isolation elements and the second bus, and the direst memory access controller controls a first path of useful data between said computer bus interface of the computer bus and the double-port memory, and a second path of data originating in said computer bus interface and traveling via the second bus, the first logical isolation elements and the computer bus in order to reach the memory connected with the microprocessor, said second path of data being used for data constituting the operating system of the microprocessor.

34. The universal coupling device of claim 29, wherein the double-port memory is a video RAM.

35. The universal coupling device of claim 34, wherein the microprocessor controls a path of data between a computer bus interface of the computer bus and the microprocessor, wherein control blocks including command characters relating to frames originating in the computer pass over the internal bus of the microprocessor, first logical isolation elements and the second bus, and the direct memory access controller controls a first path of useful data between said computer bus interface of the computer bus and the double-port memory, and a second path of data originating in said computer bus interface and traveling via the second bus, the first logical isolation elements and the computer bus in order to reach the memory connected with the microprocessor, said second path of data being used for data constituting the operating system of the microprocessor.

36. The universal coupling device of claim 29, wherein the microprocessor controls a path of data between a computer has interface of the computer bus and the microprocessor, wherein control blocks including command characters relating to frames originating in the computer pass over the internal bus of the microprocessor, first logical isolation elements and the second bus, and the direct memory access controller controls a first path of useful data between said computer bus interface of the computer bus and the double-port memory, and a second path of data originating in said computer bus interface and traveling via the second bus, the first logical isolation elements and the computer bus in order to reach the memory connected with the microprocessor, said second path of data being used for data constituting the operating system of the microprocessor.

37. The universal coupling device of claim 28, wherein the double-port memory includes a protection system including a random-access memory and a plurality of application numbers therein for use by the operating system of the microprocessor, wherein each of said application numbers corresponds to a page of the memory connected with the microprocessor, said protection system being defined by two bits whose combination defines a certain number of possible operations on any predetermined page of the memory connected with the microprocessor.

38. The universal coupling device of claim 37 wherein the double-port memory is a video RAM.

39. The universal coupling device of claim 38, wherein the microprocessor controls a path of data between a computer bus interface of the computer bus and the microprocessor, wherein control blocks including command characters relating to frames originating in the computer pass over the internal bus of the microprocessor, first logical isolation elements and the second bus, and the direct memory access controller controls a first path of useful data between said computer bus interface of the computer bus and the double-port memory, and a second path of data originating in said computer bus interface and traveling via the second bus, the first logical isolation elements and the computer bus in order to reach the memory connected with the microprocessor, said second path of data being used for data constituting the operating system of the microprocessor.

40. The universal coupling device of claim 37, wherein the microprocessor controls a path of data between a computer bus interface of the computer bus and the microprocessor, wherein control blocks including command characters relating to frames originating in the computer pass over the internal bus of the microprocessor, first logical isolation elements and the second bus, and the direct memory access controller controls a first path of useful data between said computer bus interface of the computer bus and the double-port memory, and a second path of data originating in said computer bus interface and traveling via the second bus, the first logical isolation elements and the computer bus in order to reach the memory connected with the microprocessor, said second path of data being used for data constituting the operating system of the microprocessor.

41. The universal coupling device of claim 28, wherein the double-port memory is a video RAM.

42. The universal coupling device of claim 41, wherein the microprocessor controls a path of data between a computer bus interface of the computer bus and the microprocessor, wherein control blocks including command characters relating to frames originating in the computer pass over the internal bus of the microprocessor, first logical isolation elements and the second bus, and the direct memory access controller controls a first path of useful data between said computer bus interface of the computer bus and the double-port memory, and a second path of data originating in said computer bus interface and traveling via the second bus, the first logical isolation elements and the computer bus in order to reach the memory connected with the microprocessor, said second path of data being used for data constituting the operating system of the microprocessor.

43. A universal device for coupling a computer bus of a computer to a controller of a group of peripherals connected to one another by a specific link to which the controller is physically connected, said universal device including:
  a microprocessor connected with at least one memory, said microprocessor having an operating system,
  a controller interface for linkage with the controller enabling transfer of data defining frames and control blocks wherein said control blocks include command characters relating to the frames transferred to either the link or the bus,
  a double-port random-access buffer memory connected by way of a first bus to said controller interface and by way of a second bus to the computer bus via a specific interface of the computer, means for organizing transfer of data by the microprocessor between the controller interface and the double-port memory, and between the double-port memory and the computer bus, a direct memory access controller operatively connected between said double-port memory and the computer, said transfer of data being effected under control of said direct memory access controller, wherein conversion of control blocks of protocols used on the computer bus into those used on the link and vice versa is performed by the microprocessor, which enables a transfer of control blocks used on the link over an internal bus of the microprocessor to or from the controller interface, and further comprising logical isolation elements disposed between the first bus and the internal bus of the microprocessor, and between the second bus and the internal bus of the microprocessor, respectively, in such a way as to prevent any transfer of useful data carried on the first or second buses to the internal bus of the microprocessor.

44. The universal coupling device of claim 66, wherein the double-port memory includes a protection system including a random-access memory and a plurality of application numbers therein for use by the operating system of the microprocessor, wherein each of said application numbers corresponds to a page of the memory connected with the microprocessor, said protection system being defined by two bits whose combination defines a certain number of possible operations on any predetermined page of the memory connected with the microprocessor.

45. The universal coupling device of claim 44, wherein the double-port memory is a video RAM.

46. The universal coupling device of claim 45, wherein the microprocessor controls a path of data between a computer bus interface of the computer bus and the microprocessor, wherein control blocks including command characters relating to frames originating in the computer pass over the internal bus of the microprocessor, first logical isolation elements and the second bus, and the direct memory access controller controls a first path of useful data between said computer bus interface of the computer bus and the double-port memory, and a second path of data originating in said computer bus interface and traveling via the second bus, the first logical isolation elements and the computer bus in order to reach the memory connected with the microprocessor, said second path of data being used for data constituting the operating system of the microprocessor.

47. The universal coupling device of claim 44, wherein the microprocessor controls a path of data between a computer bus interface of the computer bus and the microprocessor, wherein control blocks including command characters relating to frames originating in the computer pass over the internal bus of the microprocessor, first logical isolation elements and the second bus, and the direct memory access controller controls a first path of useful data between said computer bus interface of the computer bus and the double-port memory, and a second path of data originating in said computer bus interface and traveling via the second bus, the first logical isolation elements and the computer bus in order to reach the memory connected with the microprocessor, said second path of data being used for data constituting the operating system of the microprocessor.

48. The universal coupling device of claim 43, wherein the double-port memory is a video RAM.

49. The universal coupling device of claim 48, wherein the microprocessor controls a path of data between a computer bus interface of the computer bus and the microprocessor, wherein control blocks including command characters relating to frames originating in the computer pass over the internal bus of the microprocessor, first logical isolation elements and the second bus, and the direct memory access controller controls a first path of useful data between said computer bus interface of the computer bus and the double-port memory, and a second path of data originating in said computer bus interface and traveling via the second bus, the first logical isolation elements and the computer bus in order to reach the memory connected with the microprocessor, said second path of data being used for data constituting the operating system of the microprocessor.

50. The universal coupling device of claim 43, wherein the microprocessor controls a path of data between a computer bus interface of the computer bus and the microprocessor, wherein control blocks including command characters relating to frames originating in the computer pass over the internal bus of the microprocessor, first logical isolation elements and the second bus, and the direct memory access controller controls a first path of useful data between said computer bus interface of the computer bus and the double-port memory, and a second path of data originating in said computer bus interface and traveling via the second bus, the first logical isolation elements and the computer bus in order to reach the memory connected with the microprocessor, said second path of data being used for data constituting the operating system of the microprocessor.

51. A universal device for coupling a computer bus of a computer to a controller of a group of peripherals connected to one another by a specific link to which the controller is physically connected, said universal device including:
- a microprocessor connected with at least one memory said microprocessor having an operating system,
- a controller interface for linkage with the controller enabling transfer of data defining frames and control blocks wherein said control blocks include command characters relating to the frames transferred to either the link or the bus,
- a double-port random-access buffer memory connected by way of a first bus to said interface and by way of a second bus to the computer bus via a specific interface of the computer, means for organizing transfer of data by the microprocessor between the controller interface and the double-port memory, and between the double-port memory and the computer bus, a direct memory access controller operatively connected between said double-port memory and the computer, said transfer of data being effected under control of said direct memory access controller, wherein conversion of control blocks of protocols used on the computer bus into those used on the link and vice versa is performed by the microprocessor, which enables a transfer of control blocks used on the link over an internal bus of the microprocessor to or from the controller interface, wherein the double-port memory includes a paginated memory zone including a plurality of pages each with a plurality of lines, an address/line register, an address/page register, a serial output register connected to the second bus and defining a second port of the double-port memory, a first port being connected to the first bus, the paginated memory zone being addressed by the address/page register for addressing each of said plurality of pages and by the address/line register with respect to each of said plurality of lines of a predetermined page, the first bus and the second bus being connected to the address/page and address/line registers, respectively, by way of a combination circuit, the serial output register including pointer means for enabling transfer, one after another, of each of said plurality of lines of a page of the paginated memory zone, and wherein the double-port memory includes a protection system including a random-access memory and a plurality of application numbers stored therein for use by the operating system of the microprocessor, wherein each of said application numbers corresponds to a page of the memory, connected with the microprocessor, said protection system being defined by two bits whose combination defines a certain number of possible operations on any predetermined page of the memory connected with the microprocessor.

52. The universal coupling device of claim 51, wherein the double-port memory is a video RAM.

53. The universal coupling device of claim 52, wherein the microprocessor controls a path of data between a computer bus interface of the computer bus and the microprocessor, wherein control blocks including command characters relating to frames originating in the computer pass over the internal bus of the microprocessor, first logical isolation elements and the second bus, and the direct memory access controller controls a first path of useful data between said computer bus interface of the computer bus and the double-port memory, and a second path of data originating in said computer bus interface and traveling via the second bus, the first logical isolation elements and the computer bus in order to reach the memory connected with the microprocessor, said second path of data being used for data constituting the operating system of the microprocessor.

54. The universal coupling device of claim 51, wherein the microprocessor controls a path of data between a computer bus interface of the computer bus and the microprocessor, wherein control blocks including command characters relating to frames originating in the computer pass over the internal bus of the microprocessor, first logical isolation elements and the second bus, and the direct memory access controller controls a first path of useful data between said computer bus interface of the computer bus and the double-port memory, and a second path of data originating in said computer bus interface and traveling via the second bus, the first logical isolation elements and the computer bus in order to reach the memory connected with the microprocessor, said second path of data being used for data constituting the operating system of the microprocessor.

* * * * *

UNITED STATES PATENT AND TRADEMARK OFFICE
CERTIFICATE OF CORRECTION

PATENT NO. : 5,367,646
DATED : Nov. 22, 1994
INVENTOR(S) : PARDILLOS et al.

It is certified that error appears in the above-indentified patent and that said Letters Patent is hereby corrected as shown below:

Col. 14, Line 5 (Claim 8, Line 1) "23" should be -- 5 --.

Col. 14, line 37 (Claim 10, line 14) "connect" should be -- connected --.

Col. 16, line 42 (Claim 24, line 1) "25" should be -- 23 --.

Col. 18, line 39 (Claim 36, line 3) "has" should be -- bus --.

Col. 20, line 22 (Claim 44, line 1) "66" should be -- 43 --.

Signed and Sealed this

Sixteenth Day of July, 1996

Attest:

BRUCE LEHMAN

Attesting Officer

Commissioner of Patents and Trademarks